(12) United States Patent
Bacher et al.

(10) Patent No.: US 10,263,291 B2
(45) Date of Patent: Apr. 16, 2019

(54) METHOD OF PRODUCING A PRISMATIC BATTERY CELL

(71) Applicant: Robert Bosch GmbH, Stuttgart (DE)

(72) Inventors: Antonio Bacher, Kyoto (JP); Rene Hornung, Eisenach (DE); Seyed Mohammad Seyed Abbassi, Pforzheim (DE); Cihan Kaplan, Kyoto (JP); Anselm Berg, Ludwigsburg (DE); Michael Riefler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 15/329,185

(22) PCT Filed: Jul. 13, 2015

(86) PCT No.: PCT/EP2015/065962
§ 371 (c)(1),
(2) Date: Jan. 25, 2017

(87) PCT Pub. No.: WO2016/012294
PCT Pub. Date: Jan. 28, 2016

(65) Prior Publication Data
US 2017/0207490 A1    Jul. 20, 2017

(30) Foreign Application Priority Data
Jul. 25, 2014 (DE) .................. 10 2014 214 619

(51) Int. Cl.
*H01M 4/02*         (2006.01)
*H01M 10/0587*      (2010.01)
(Continued)

(52) U.S. Cl.
CPC ....... *H01M 10/0587* (2013.01); *H01M 2/024* (2013.01); *H01M 2/263* (2013.01);
(Continued)

(58) Field of Classification Search
CPC ..................................................... H01M 4/02
See application file for complete search history.

(56) References Cited

U.S. PATENT DOCUMENTS 5,552,239 A     9/1996  Gozdz et al.
6,007,944 A *  12/1999  Bechtold ............... H01M 2/021
                                                    429/211
(Continued)

FOREIGN PATENT DOCUMENTS

CN     102742046 A    10/2012
CN     103378373 A    10/2013
(Continued)

OTHER PUBLICATIONS

International Search Report corresponding to PCT Application No. PCT/EP2015/065962, dated Sep. 10, 2015 (German and English language document) (8 pages).

*Primary Examiner* — Jacob B Marks
(74) *Attorney, Agent, or Firm* — Maginot, Moore & Beck LLP

(57) ABSTRACT

A method of producing a prismatic battery cell includes forming an initial arrangement by spatially arranging one or two wiring boards, a cathode layer, an anode layer, and at least two separator layers so as to be in parallel with each other and with respect to a winding axis. The initial arrangement is wound about the winding axis to form a battery winding. The battery winding is inserted in a cell housing, and a respective current connector is connected to each of the cathode layer and anode layer. The cell housing is filled with a liquid electrolyte, and is closed. A prismatic battery cell of this type can be included in a battery, such as a battery included with an automotive vehicle.

14 Claims, 10 Drawing Sheets

(51) Int. Cl.
  *H01M 2/26* (2006.01)
  *H01M 2/36* (2006.01)
  *H01M 10/0525* (2010.01)
  *H01M 10/647* (2014.01)
  *H01M 2/02* (2006.01)
  *H01M 2/20* (2006.01)

(52) U.S. Cl.
  CPC ....... *H01M 2/362* (2013.01); *H01M 10/0525* (2013.01); *H01M 10/647* (2015.04); *H01M 2/0237* (2013.01); *H01M 2/20* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 8,641,015 | B2 | 2/2014 | Omarsson et al. |
| 8,685,557 | B2 | 4/2014 | Viavattine et al. |
| 2007/0180686 | A1 | 8/2007 | Woo |
| 2008/0280197 | A1* | 11/2008 | Machida ................. H01M 4/13 429/129 |
| 2012/0189888 | A1 | 7/2012 | Wang et al. |
| 2013/0280568 | A1* | 10/2013 | Miyazaki .......... H01M 10/0431 429/94 |
| 2014/0038013 | A1 | 2/2014 | Dudziak et al. |

FOREIGN PATENT DOCUMENTS

| | | |
|---|---|---|
| DE | 10 2011 015 830 A1 | 10/2012 |
| DE | 10 2012 213 420 A1 | 2/2014 |
| DE | 10 2012 224 250 A1 | 7/2014 |
| EP | 1 717 895 A1 | 11/2006 |
| EP | 2 755 258 A1 | 7/2014 |
| JP | 2002-280055 A | 9/2002 |
| JP | 2007-200756 A | 8/2007 |
| JP | 2008-47304 A | 2/2008 |
| JP | 2009-206060 A | 9/2009 |
| JP | 2009-266737 A | 11/2009 |
| WO | 2012/004886 A1 | 1/2012 |
| WO | 2012/042612 A1 | 4/2012 |
| WO | 2013/075663 A1 | 5/2013 |

* cited by examiner

METHOD OF PRODUCING A PRISMATIC BATTERY CELL

This application is a 35 U.S.C. § 371 National Stage Application of PCT/EP2015/065962, filed on Jul. 13, 2015, which claims the benefit of priority to Serial No. DE 10 2014 214 619.4, filed on Jul. 25, 2014 in Germany, the disclosures of which are incorporated herein by reference in their entirety.

The invention relates to a method for producing a prismatic battery cell, wherein the battery cell comprises a cathode layer, an anode layer and at least two separator layers.

Moreover, the invention relates to a prismatic battery cell that is produced in accordance with the method, and also a vehicle in which a prismatic battery cell of this type is installed.

BACKGROUND

Lithium ion rechargeable batteries that are used in the automobile industry often have a prismatic shape for the purpose of capacity utilization. By way of example, battery windings (jelly rolls) that are pressed flat are located in the interior of a cell housing, said battery windings being rolled from an anode, a cathode and separator layers. The cell housing is filled with a fluid electrolyte after inserting the battery winding and prior to the cell housing being closed in a pressure-tight manner. U.S. Pat. No. 8,641,015 B2 discloses by way of example a prismatic battery cell of this type having four battery windings that are arranged therein.

The electrodes which are described within the scope of the present disclosure as the cathode and the anode are contacted in an electrical manner by way of example in the following manner: The two electrodes are not placed precisely one on top of the other but rather are slightly offset in the direction of the winding axis. This method is disclosed by way of example in DE 10 2012 213 420 A1. It is thus possible on an open narrow side of the battery winding to tap the negative voltage and on the other opposite-lying open narrow side to tap the positive voltage of the respective electrode. Contact with the protruding foil strips is achieved using welded-on, strip-shaped sheet metal parts of copper or aluminum, the so-called current collectors. It is particularly challenging to produce the contacting arrangement of the current collectors in the interior of the cell housing and to route the current paths through the cell housing towards the outside. After inserting the battery winding into the cell housing and after closing the cell housing, said cell housing is filled with electrolyte through a small aperture in the cover of the cell housing. As one of the final procedures in the production of the battery cell, this aperture is closed by a closing element.

Further examples of jelly rolls are disclosed in U.S. Pat. No. 5,552,239 and JP 2009-266737.

US 2012/0189888 discloses a lithium ion battery cell in which a cathode layer and an anode layer are wound in a spiral-shape using a separator that is positioned between said cathode layer and anode layer.

SUMMARY

In the case of a method in accordance with the disclosure for producing a prismatic battery cell, wherein the prismatic battery cell comprises a cathode layer, an anode layer and at least two separator layers, it is provided that one or two winding boards, the cathode layer, the anode layer and the at least two separator layers are arranged spatially parallel to one another and parallel in relation to a winding axis so as to produce an initial arrangement, the initial arrangement is wound around the winding axis so as to produce a battery winding, the battery winding is inserted into a cell housing, the cathode layer and the anode layer are contacted by current collectors, the cell housing is filled with a fluid electrolyte and the cell housing is closed.

The chronological sequence of the steps in which the battery winding is inserted into a cell housing, the cathode layer and the anode layer are contacted by current collectors and the cell housing is filled with a fluid electrolyte is arbitrary.

According to an advantageous embodiment, precisely one battery winding is inserted into the cell housing, wherein the battery winding comprises precisely one cathode layer and precisely one anode layer. This leads to lower costs when welding since it is only necessary to weld one individual battery winding on to a current collector. In particular, this leads to a saving in materials in the case of the current collectors since it is no longer necessary to guide said current collectors by means of branches to multiple battery windings. Advantages are also to be seen in the production procedure since further working steps are omitted if fewer individual parts are present. One single unbranched current collector can be used per electrode. The contour of the current collector can be changed as a result of which said current collector is easier to produce. The cathode layer and the anode layer can be referred to within the scope of the present disclosure as a cathode or anode or together also as the electrodes.

According to one embodiment, two winding boards and three separator layers are used. In step a) the cathode layer, the anode layer and the three separator layers are arranged perpendicular to the winding axis in a layer stack one above the other and a winding board is arranged in each case above and below the layer stack parallel to the winding axis, wherein the layer stack comprises the layers in the sequence: separator layer, anode layer, separator layer, cathode layer, separator layer. In step b) said layer stack is wound around the two winding boards.

According to an alternative embodiment, a winding board and two separator layers are used, wherein in step a) initially the cathode layer and the anode layer and the two separator layers are fastened to the winding board and in step b) are wound around the winding board. The anode and the cathode are welded at welding surfaces to the winding board at the beginning of the winding procedure. The separators are likewise fixed to the winding board, by way of example bonded, crimped, clamped or welded, in particular by means of ultrasonic welding or laser welding.

One advantage of this alternative embodiment is that a longer uncoated electrode edge is no longer required. Only the contact surfaces at which the winding board is welded to the electrodes are free from the coating material. This leads to an increased capacity, an increased energy density and to savings in material costs.

The winding board is preferably embodied as a planar plate, by way of example having a rectangular cross section having a first longer side and a second shorter side. The winding board is by way of example produced from synthetic material, in particular from PBT, PP, PE, PET or PEAK.

According to a preferred embodiment, the contacting arrangement of the cathode layer and/or the anode layer to the current collectors is produced in step d) by way of the winding board. For this purpose, the winding board comprises on its front-side and its rear-side welding sites for contacting the electrodes and connecting surfaces for contacting the current collector. In the case of the cathode, the welding surface is by way of example an aluminum strip and in the case of the anode a copper strip.

At the beginning of the winding procedure, the cathode and the anode are welded at the welding surfaces to the winding board. The welding surfaces lie by way of example perpendicular or parallel to the winding axis or essentially perpendicular or essentially parallel to the winding axis so that a sufficient contacting arrangement is produced and that moreover a sufficiently robust connection is present during the winding procedure. In the case of the electrodes, preferably only the contact surfaces that are welded are free from coating material. This leads to a greater capacity, greater energy density and a saving in material costs.

In accordance with one embodiment, the winding axis lies parallel to a longer side of the winding board so that the initial arrangement is wound around the longer side of the winding board. The cathode layer and the anode layer are fastened in this embodiment by way of welding surfaces to the winding board, said welding surfaces extending over the longer side of the winding board. The contact regions by way of which the current collectors are contacted extend over the shorter side of the winding board.

In accordance with an alternative embodiment, the winding axis lies parallel to the shorter side of the winding board so that the initial arrangement is wound around the shorter side of the winding board. The welding surfaces by way of which the cathode layer and the anode layer are fixed to the winding board extend over the shorter side of the winding board.

In accordance with a further embodiment, the winding board comprises connecting surfaces that lie opposite terminals of the battery cell. Advantageously, as a consequence greatly shortened current collectors can be used in order to bridge the path from the terminals to the contact regions. The connecting surfaces of the winding board are electrically connected to the welding surfaces at which the electrodes are fixed.

According to a particularly advantageous embodiment, in step c) the battery winding is inserted into the cell housing in such a manner that a filling aperture and/or a bursting membrane lies in alignment with the winding axis. If the filling aperture lies in alignment with the winding axis, the battery windings require less time when being filled with the fluid electrolyte to become fully saturated. The through flow direction of the fluid during filling through the filling aperture ideally lies parallel to the winding axis. Even in the event of damage to the battery cell, a main direction of the dynamics that occurs as a result lies parallel to the winding axis. Consequently, in the event of an excess pressure the fluid or gases escape at the bursting aperture. The term "in alignment with the winding axis" refers to the filling aperture either lying on the winding axis or at a small spacing with respect to said winding axis.

In the case of the embodiment having two winding boards and three separator layers, the welding surfaces of the electrodes having the current collectors are preferably arranged parallel to the winding axis so that during insertion of the battery winding into the cell housing if the filling aperture and/or the bursting membrane lies in alignment with the winding axis, the described advantages are produced.

According to a further aspect, a prismatic battery cell is provided that has been produced according to any one of the described methods, wherein the winding board remains in the cell housing, in particular in the battery winding. The features that are described within the scope of the method accordingly likewise apply for the prismatic battery cell that has been produced in this manner.

Moreover, in accordance with the disclosure a motor vehicle having a battery is provided, wherein the battery comprises at least one battery cell of this type. The battery is preferably connected to a drive system of the motor vehicle. The motor vehicle can be embodied as a pure electric vehicle and can comprise an exclusively electric drive system. Alternatively, the motor vehicle can be equipped as a hybrid vehicle that comprises an electric drive system and an internal combustion engine. In some variants, it can be provided that the battery of the hybrid vehicle can be charged internally by way of a generator using excess energy of the internal combustion engine. Hybrid vehicles that can be charged externally (PHEV, plug-in hybrid electric vehicle) additionally provide the possibility of charging the battery by way of the external power supply.

BRIEF DESCRIPTION OF THE DRAWINGS

Exemplary embodiments of the disclosure are illustrated in the drawings and are further explained in the description hereinunder.

In the drawings

Figure 1:
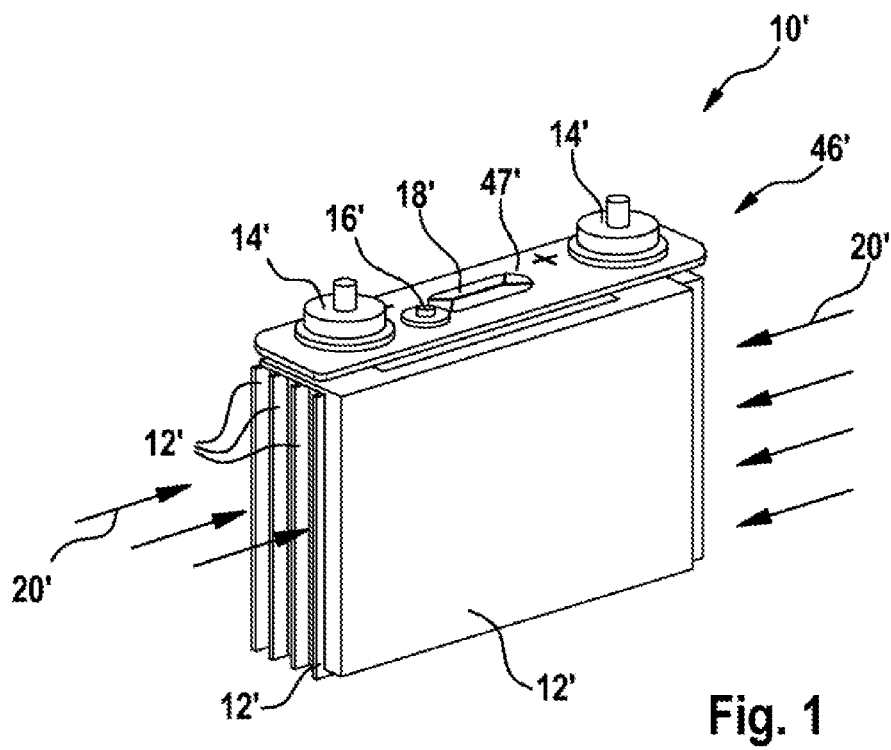
FIG. 1 illustrates a perspective view of a prismatic battery cell in accordance with the prior art.

In the description hereinunder of the exemplary embodiments of the disclosure, identical or similar components and elements are referred to by identical or similar reference numerals, wherein a repeated description of these components or elements is omitted in individual cases. The figures illustrate the subject matter of the disclosure only in a schematic manner.

DETAILED DESCRIPTION

FIG. 1 illustrates a perspective view of a prismatic battery cell 10' in accordance with the prior art.

The prismatic battery cell 10' is illustrated for the sake of clarity without a cell housing and comprises four battery windings 12' that are arranged close to one another and a cover assembly 46', wherein the cover assembly 46' comprises two terminals 14' as a result of which the prismatic battery cell 10' is contacted from the outside in an electrical manner.

Moreover, the cover assembly 46 is allocated a filling aperture 16' and a bursting membrane 18'. The filling aperture 16' and the bursting membrane 18' lie essentially in the center of a closing plate 47', whereas the terminals 14' are placed at either end of the closing plate 47'. The battery windings 12' are inserted into a cell housing and are filled with the fluid electrolyte. An inflow direction 20' of a fluid electrolyte is indicated by means of arrows. The fluid electrolyte is filled vertically in FIG. 1 by way of the filling aperture 16' and then flows horizontally into the battery windings 12' that are fully saturated with the fluid electrolyte. The cell housing is subsequently closed by the cover assembly 46.

Figure 2A:
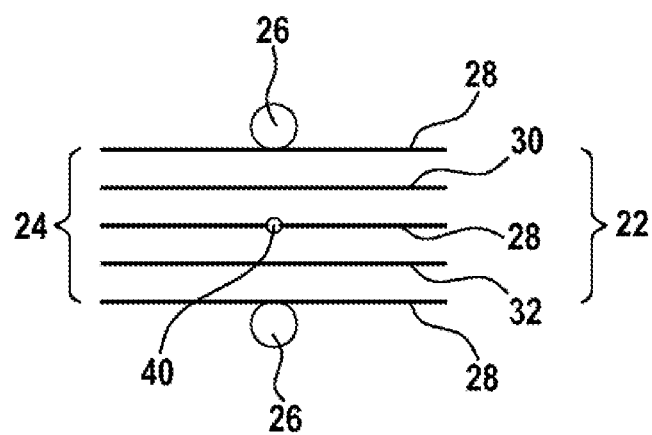
FIGS. 2A, 2B, 2C illustrate initial arrangements and battery windings in accordance with an embodiment of the disclosure.

FIG. 2A illustrates an initial arrangement 22 in accordance with a first embodiment of the disclosure, wherein the initial arrangement 22 comprises a layer stack 24 and two winding boards 26 that are arranged opposite one another above and below the layer stack 24. The winding boards 26 are arranged parallel to a winding axis 40 that is located in an exemplary manner in the center between the winding boards 26.

The layer stack 24 comprises three separator layers 28, a cathode layer 30 and an anode layer 32, wherein in the illustrated embodiment the sequence of the layers is specified as: separator layer 28, anode layer 32, separator layer 28, cathode layer 30, separator layer 28.

Figure 2B:
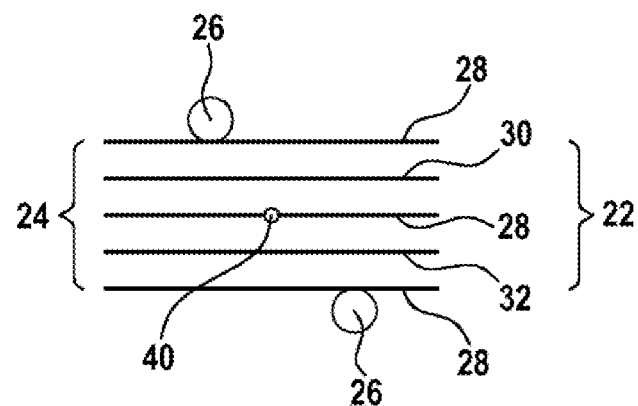

FIG. 2B illustrates an alternative embodiment of the initial arrangement 22, wherein the winding boards 26 are arranged offset with respect to one another above and below the layer stack 24. The winding axis 40 is located in turn in an exemplary manner in the center between the winding boards 26.

The separator layers 28, cathode layer 30 and anode layer 32 can be supplied by way of example by continuous belts or rolls of a winding device that comprises the winding boards 26.

Figure 2C:
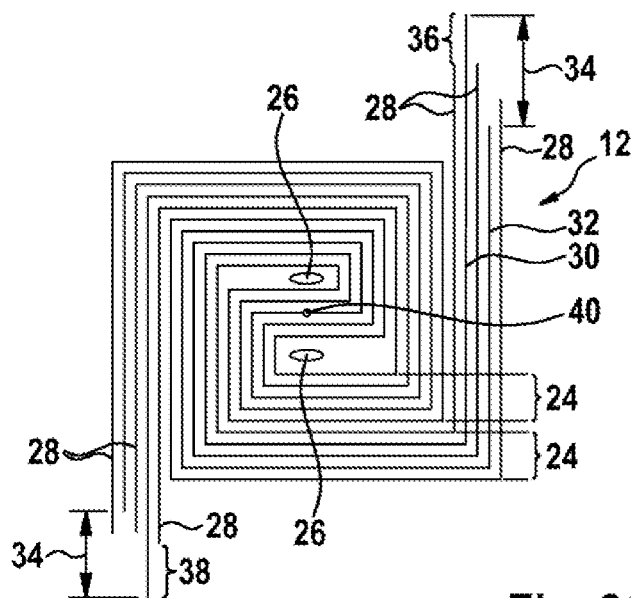

FIG. 2C illustrates a battery winding 12 in accordance with the disclosure, said battery winding being achieved after a 450° rotation when winding around the winding axis 40 from the initial arrangement 22 that is illustrated in FIG. 2A.

The anode layer 32 and the cathode layer 30 are arranged offset with respect to one another longitudinally by an offset 34, by way of example by means of cutting the continuous belt so that on the end of the battery winding 12, in FIG. 2C on the upper and on the lower side, in each case a first connecting surface 36 is formed for the cathode and a second connecting surface 38 is formed for the anode.

The two winding boards 26 can subsequently be removed or can remain in the battery winding 12. Said winding boards are preferably removed in this embodiment in order to reduce the volume weight of the prismatic battery cell 10.

Figure 3:
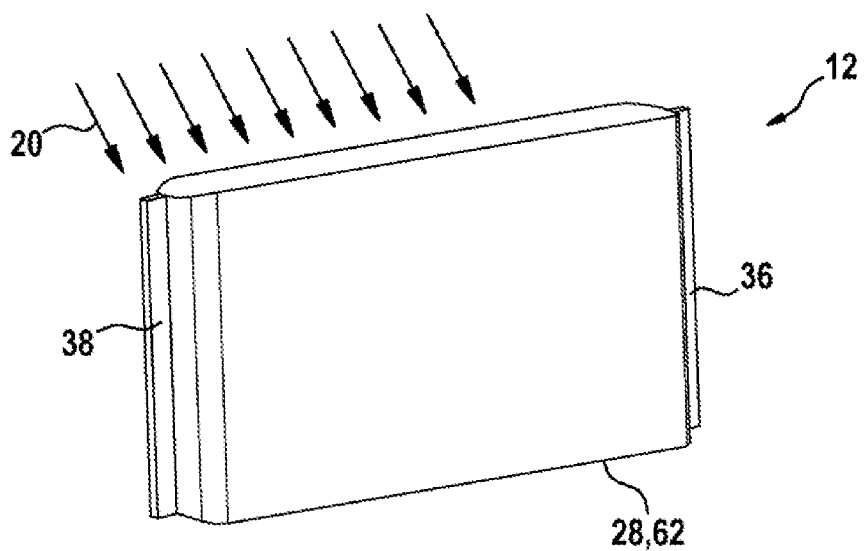
FIG. 3 illustrates a perspective view of a battery winding in accordance with an embodiment of the disclosure.

FIG. 3 illustrates the battery winding 12 that is produced in the arrangement that is illustrated in FIG. 2C after a pressing step. The battery winding 12 comprises wound layers 62, wherein usually one of the separator layers 28 is arranged on the outer side. Moreover, after the pressing procedure, the battery winding 12 comprises on the outer side the first connecting surface 36 of the cathode and the second connecting surface 38 of the anode so as to contact current collectors 42, 44.

Figure 4:
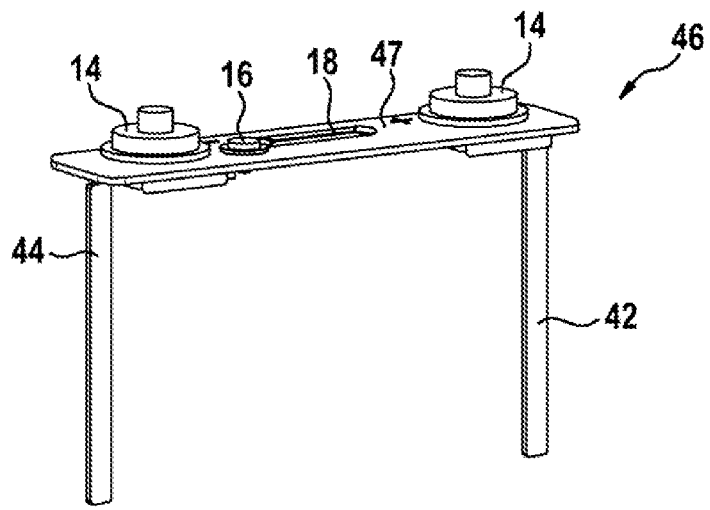
FIG. 4 illustrates a perspective view of a cover assembly in accordance with an embodiment of the disclosure.

FIG. 4 illustrates a cover assembly 46 that is in accordance with the disclosure and comprises a closing plate 47 having a filling aperture 16, which is arranged on said closing plate, and having a bursting membrane 18 and terminals 14, as is known from the prior art, and also a first current collector 42 of the cathode and a second current collector 44 of the anode.

The battery winding 12 can be inserted into the cell housing in such a manner that an inflow direction 20 (illustrated in FIG. 3) of the fluid electrolyte lies parallel to the filling aperture 16 and/or to the bursting membrane 18.

Figure 5:
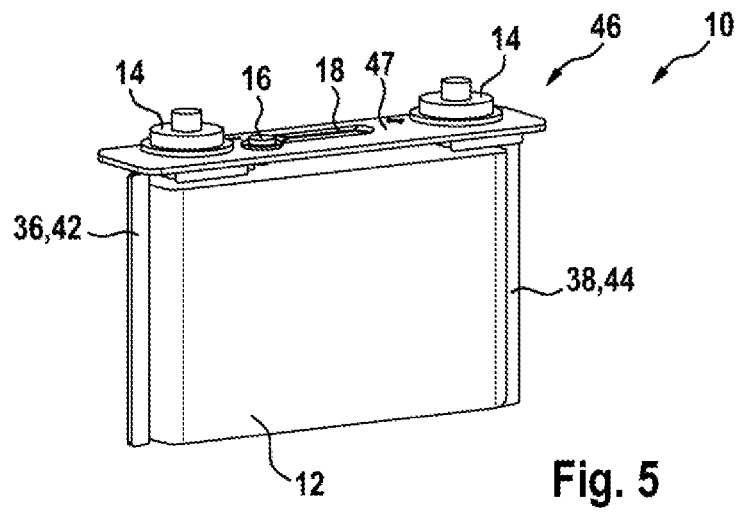
FIG. 5 illustrates a perspective view of a battery winding that is welded to a cover assembly.

FIG. 5 illustrates the assembly of the cover assembly 46 and the battery winding 12, wherein the connecting surfaces 36, 38 are welded to the corresponding current collectors 42, 44. Advantageously, only one individual battery winding 12 is arranged in the housing of the prismatic battery cell 10, which leads to an increase in the energy density.

Figure 6A:
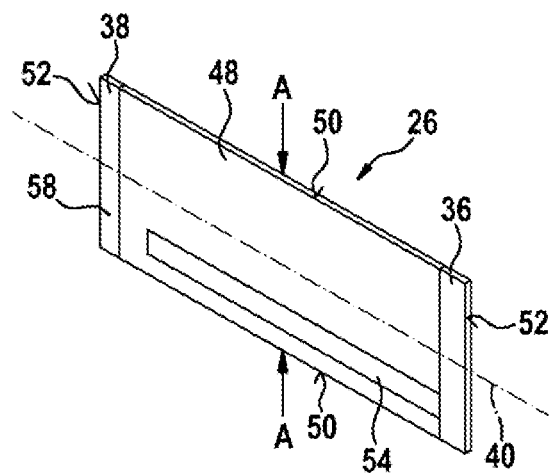
FIG. 6A, 6B illustrate a perspective view of a winding board in accordance with one embodiment of the disclosure.
Figure 6B:
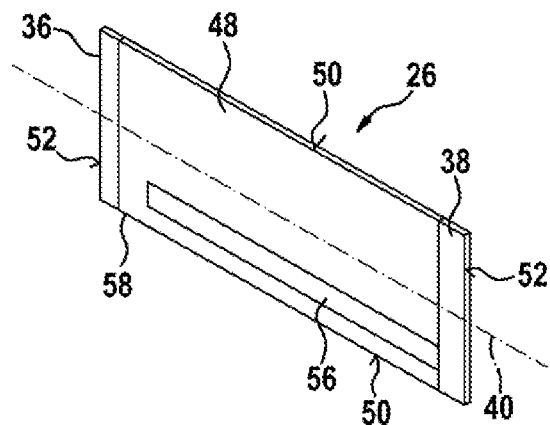

FIG. 6A and FIG. 6B illustrate a winding board 26 from the front side (FIG. 6A) and from the rear side (FIG. 6B).

The winding board 26 is embodied by way of example from a synthetic material plate 48. The synthetic material plate 48 has a rectangular base surface having a longer side 50 and a shorter side 52.

The winding axis 40 is arranged in this exemplary embodiment parallel to the longer side 50. A first welding surface 54 of the cathode layer 30 is located on the longer side 50 and a corresponding second welding surface 56 of the anode layer 32 is located on the rear side of the winding board 26. The welding surfaces 54, 56 are electrically connected to the connecting surfaces 36, 38 that are located on the shorter sides 52 of the winding board 26. The welding surfaces 54, 56 are spaced from opposite pole connecting surfaces 36, 38 by means of insulating sections 58.

The first welding surface 54 of the cathode layer 30 and the first connecting surface 36 of the cathode layer 30 are embodied by way of example from aluminum, while the second welding surface 56 of the anode layer 32 and the second current collector 44 of the anode layer 32 can be embodied from copper.

Figure 7:
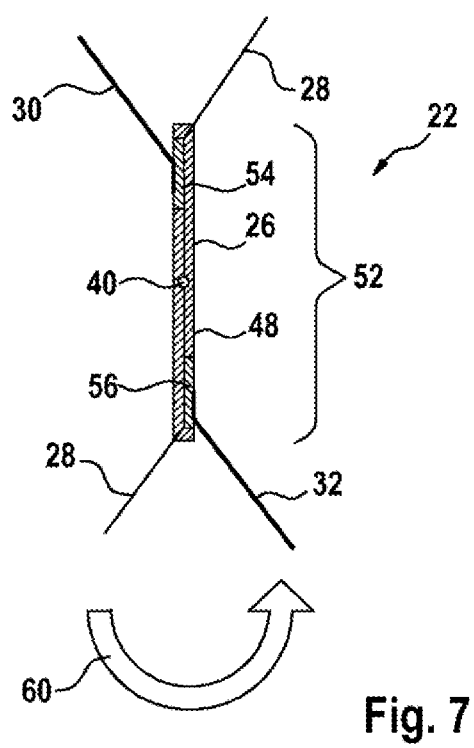
FIG. 7 illustrates a sectional view of an initial arrangement in accordance with a further embodiment of the disclosure.

FIG. 7 illustrates the initial arrangement 22 having the winding board 26, two separator layers 28, a cathode layer 30 and an anode layer 32, wherein the winding board 26 is embodied as described with reference to FIGS. 6A and 6B. A sectional view along the line A-A from FIG. 6A is illustrated. An arrow illustrates a winding direction 60 of the initial arrangement 22. The cathode layer 30 is welded onto the first welding surface 54 and the anode layer 32 is welded onto the second welding surface 56. The two separator layers 28 are arranged in an exemplary manner lying opposite one another and insulate the cathode layer 30 from the anode layer 32.

Figure 8A:
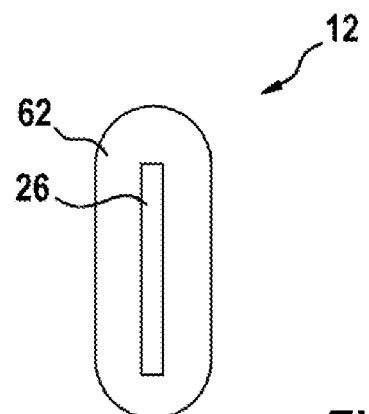
FIGS. 8A, 8B illustrate a sectional view and a plan view of a battery winding in accordance with a further embodiment of the disclosure.

FIG. 8A illustrates the battery winding 12, which is produced after winding the initial arrangement 22 that is illustrated in FIG. 7. The winding board 26 is located in the center of the battery winding 12, said winding board providing the contacting arrangement of the cathode layer 30 and the anode layer 32 to the current collectors 42, 44. The wound layers 62 are located around the winding board 26.

Figure 8B:
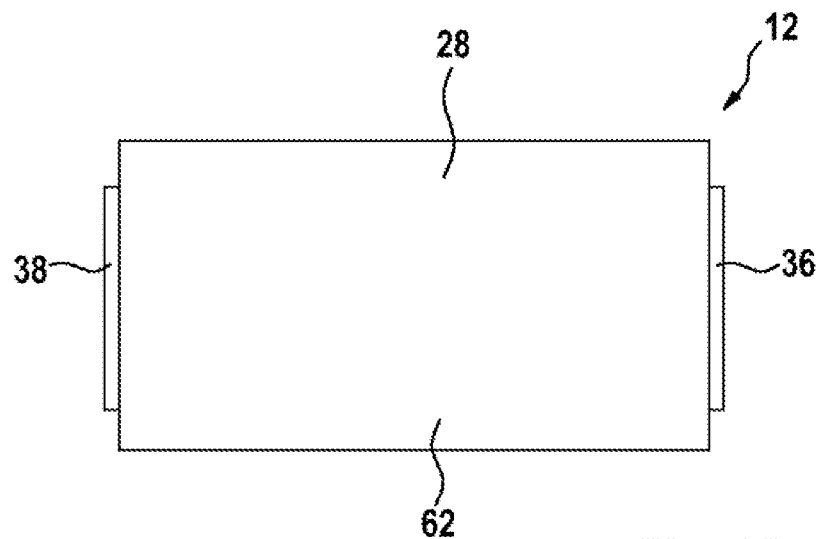

FIG. 8B illustrates a plan view from the side of the battery winding 12, said battery winding being achieved after the procedure of winding the initial arrangement 22 that is illustrated in FIG. 7 about the winding axis 40. The arrangement that is illustrated in FIG. 8A is illustrated rotated by 90°. The connecting surfaces 36, 38 protrude laterally out of the wound layers so that a contacting arrangement to the cover assembly 46 can be produced as is illustrated in FIG. 5, wherein the connecting surfaces 36, 38 are welded to the corresponding current collectors 42, 44.

Figure 9A:
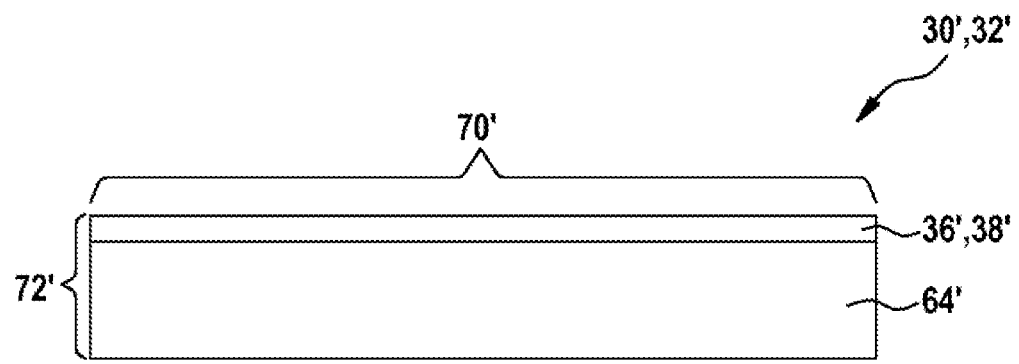
FIGS. 9A, 9B illustrate a plan view of conventional electrode layers and electrode layers in accordance with the disclosure in comparison.

FIG. 9A illustrates a conventional electrode 30', 32' that comprises a connecting surface 36', 38' that extends entirely over a longitudinal side 70' of the electrode 30', 32', wherein the longitudinal side 70' is longer than a transverse side 72'.

Figure 9B:
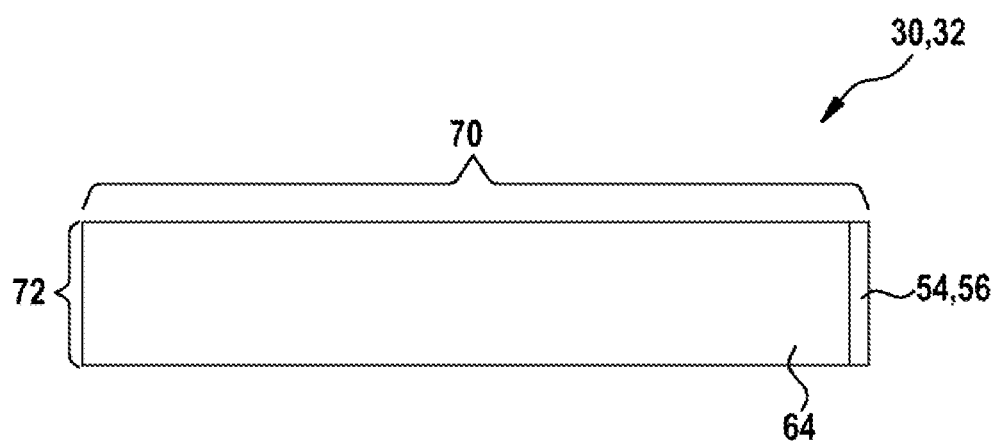

FIG. 9B illustrates an electrode 30, 32 in accordance with the disclosure, wherein said electrode comprises the welding surface 54, 56 as described, said welding surfaces extending over a transverse side 72 of the electrode 30, 32. In contrast with a surface 64' of the conventional electrode 30', 32' that can be coated with an active material, a surface 64 of the conventional electrode 30, 32 that can be coated with an active material is enlarged.

Figure 10A:
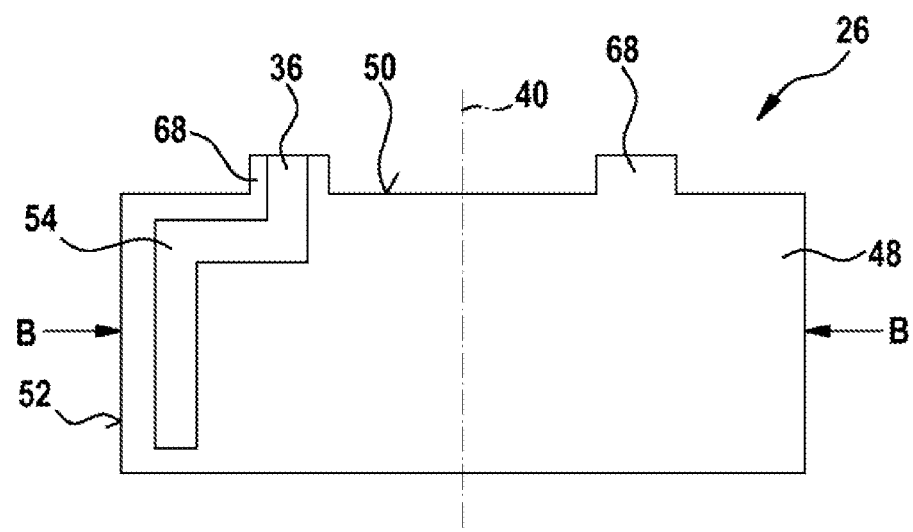
FIGS. 10A, 10B illustrate a front-side and rear-side of a winding board in accordance with a further embodiment of the disclosure.
Figure 10B:
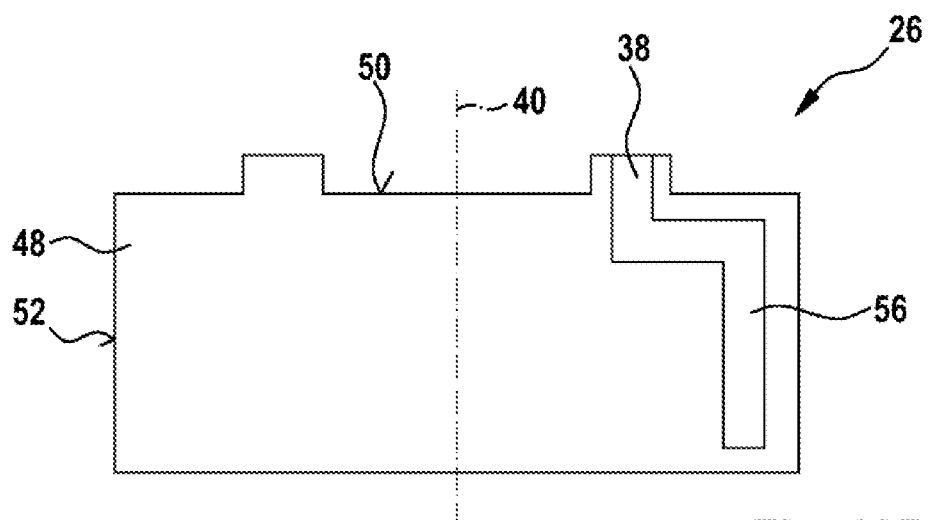

FIG. 10A and FIG. 10B illustrate a further embodiment of a winding board 26 according to FIG. 6A and FIG. 6B.

While the winding axis 40 in FIG. 6A and FIG. 6B extends parallel to the longer side 50 of the winding board 26, in accordance with this embodiment the winding axis 40 is arranged parallel to the shorter side 52 of the winding board 26. Accordingly, the first welding surface 54 of the cathode layer 30 and the second welding surface 56 of the anode layer 32 extend over the short side 52 of the winding board 26. The winding board 26 comprises on one of its longer sides 50 two protrusions 68 that render possible the contacting arrangement to the current collectors 42, 44. As a consequence, the path to the terminals 14 is shortened as is further explained with reference to FIG. 12. The welding surfaces 54, 56 are electrically connected to the connecting surfaces 36, 38 that are arranged on the protrusions 68 of the winding board 26.

Prior to the winding procedure, the cathode layer 30 is welded to the first welding surface 54 and the anode layer 32 is welded to the second welding surface 56, and two separator layers 28 are arranged, wherein the initial arrangement 22 that is described with reference to FIG. 7 is produced when sectioned along the line B-B illustrated in FIG. 10A.

Figure 11A:
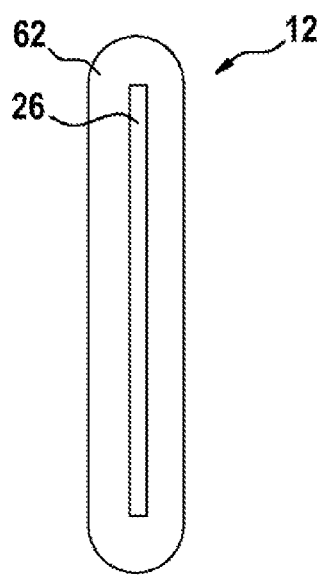
FIGS. 11A, 11B illustrate a sectional view and a lateral plan view of a battery winding in accordance with a further embodiment of the disclosure.

FIG. 11A illustrates the battery winding 12 that is produced in the arrangement that is described with reference to FIG. 10, with the winding board 26 and the wound layers 62.

Figure 11B:
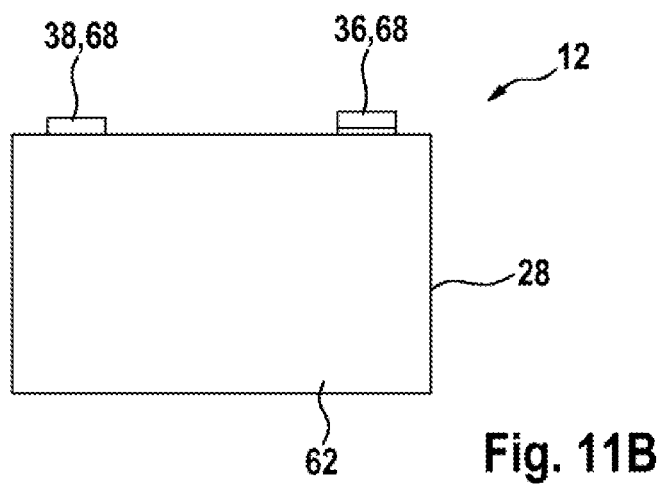

FIG. 11B illustrates the battery winding 12 in a lateral plan view. The protrusions 68 of the winding board 26 form the connecting surfaces 36, 38 for the terminals 14.

Figure 12A:
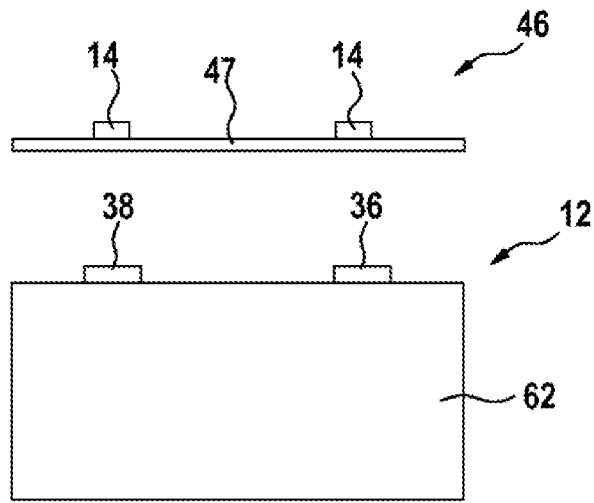
FIGS. 12A, 12B illustrate a lateral plan view of conventional cover assemblies and battery windings and cover assemblies and battery windings in accordance with the disclosure in comparison.
Figure 12B:
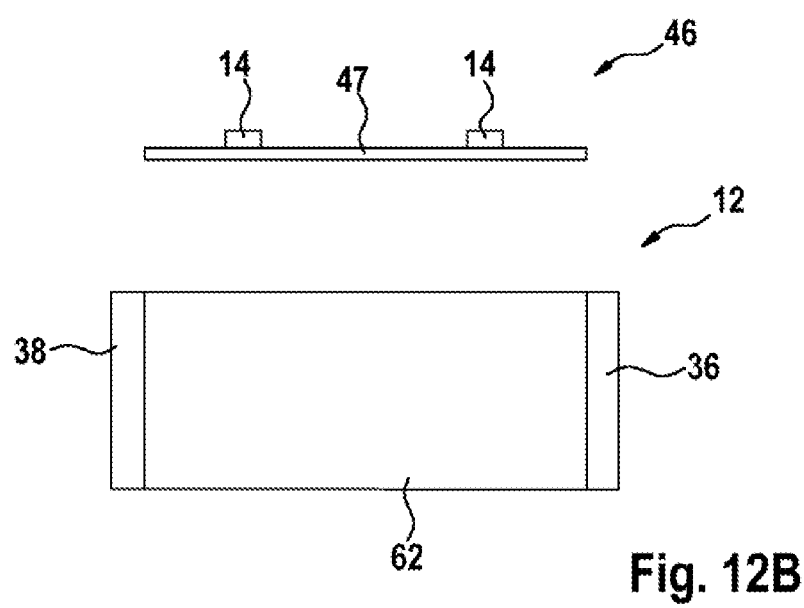

FIG. 12A and FIG. 12B illustrate the shortened path of the contacting arrangement of the battery winding 12 to the terminals 14 of the cover assembly 46, said shortened path being produced with the embodiment (FIG. 12A) that is described with reference to FIGS. 10A, 10B, 11A and 11B in comparison to the embodiment that is described with reference to FIGS. 6A, 6B, 8A and 8B.

The disclosure is not limited to the exemplary embodiments that are described herein and the aspects that are highlighted therein. On the contrary, within the scope that is disclosed in the claims a plurality of modifications that lie within the scope of the knowledge of the person skilled in the art is possible.

The invention claimed is:

1. A method of producing a prismatic battery cell, comprising:
   spatially arranging one or two winding boards, a cathode layer an anode layer, and at least two separator layers parallel to each other and parallel in relation to a winding axis to form an initial arrangement;
   winding the initial arrangement around the winding axis to form a battery winding;
   inserting the battery winding into a cell housing;
   contacting each of the cathode layer and the anode layer to a respective current collector via respective conductive surface portions of the one or two winding boards;
   filling the cell housing with a fluid electrolyte; and
   closing the cell housing.

2. A method of producing a prismatic battery cell, comprising:
   forming an initial arrangement by:
      spatially arranging two winding boards, a cathode layer, an anode layer, and at least three separator layers parallel to each other and parallel in relation to a winding axis,
      spatially arranging the cathode layer, the anode layer and the three separator layers perpendicular to the winding axis and one above another in a sequence of a first separator layer, the anode layer, a second separator layer, the cathode layer, and a third separator layer to form a layer stack,
      spatially arranging a first winding board above the layer stack and parallel to the winding axis, and
      spatially arranging a second winding board below the layer stack and parallel to the winding axis;
   winding the initial arrangement with the layer stack around the first winding board and the second winding board to form a battery winding;
   inserting the battery winding into a cell housing;
   contacting each of the cathode layer and the anode layer to a respective current collector;
   filling the cell housing with a fluid electrolyte; and
   closing the cell housing.

3. The method as claimed in claim 1, wherein:
   forming the initial arrangement includes fastening two separator layers, the cathode layer, and the anode layer to a winding board to form a layer stack; and
   winding the initial arrangement includes winding the layer stack around the winding board.

4. The method as claimed in claim 3, wherein:
   the conductive surface portions of the winding board include a first contact surface and a first connecting surface electrically connected to the first contact surface,
   forming the battery winding includes fastening the cathode layer to the first contact surface before winding the initial arrangement around the winding axis, and
   contacting the cathode layer to the respective current collector includes contacting the first connecting surface of the winding board to the respective current collector to form an electrical connection therebetween.

5. The method as claimed in claim 3, wherein the winding axis lies parallel to a longer side of the winding board relative to a shorter side so that the initial arrangement is wound around the longer side of the winding board.

6. The method as claimed in claim 3, wherein the winding axis lies parallel to a shorter side of the winding axis relative to a longer side so that the initial arrangement is wound around the shorter side of the winding board.

7. The method as claimed in claim 6, wherein the winding board includes connecting surfaces that lie opposite terminals of the prismatic battery cell, the connecting surfaces of the winding board configured to form an electrical connection between the cathode layer and a first terminal and between the anode layer and a second terminal.

8. The method as claimed in claim 1, wherein inserting the battery winding into the cell housing is performed such that at least one of a filling aperture and a bursting membrane lies in alignment with the winding axis.

9. The method as claimed in claim 4, wherein:
the conductive surface portions of the winding board include a second contact surface and a second connecting surface electrically connected to the second contact surface,
forming the battery winding includes fastening the anode layer to the second contact surface before winding the initial arrangement around the winding axis, and
contacting the anode layer to the respective current collector includes contacting the second connecting surface of the winding board to the respective current collector to form an electrical connection therebetween.

10. The method as claimed in claim 9, wherein the first contact surface and the first connecting surface are electrically isolated from the second contact surface and the second connecting surface via a material of the winding board.

11. The method as claimed in claim 9, wherein the first and second contact surfaces are disposed on opposite sides of the winding board and face in opposite directions.

12. The method as claimed in claim 9, wherein the first and second connecting surfaces are disposed at opposite ends of the winding board.

13. The method as claimed in claim 12, wherein the first and second connecting surfaces are spaced from one another in a direction parallel to the winding axis.

14. A prismatic battery cell, comprising:
a closed cell housing;
a battery winding positioned in the cell housing, the winding including one or two winding boards, a cathode layer, an anode layer, and at least two separator layers that are parallel to each other and that are wound about a winding axis;
a respective current collector connected to each of the cathode layer and the anode layer via respective conductive surface portions of the one or two winding boards; and
a fluid electrolyte that fills a remainder of the cell housing;
wherein the one or two winding boards are configured to remain in the cell housing.

* * * * *